United States Patent [19]

Ouchi

[11] Patent Number: 5,675,421
[45] Date of Patent: Oct. 7, 1997

[54] FACSIMILE MACHINE WITH A MAILBOX FUNCTION AND REMOTE OPERATION MODE

[75] Inventor: Tetsuya Ouchi, Tajimi, Japan

[73] Assignee: Brother Kogyo Kabushiki Kaisha, Nagoya, Japan

[21] Appl. No.: 653,312

[22] Filed: May 24, 1996

[30] Foreign Application Priority Data

Jun. 2, 1995 [JP] Japan ................... 7-136595

[51] Int. Cl.$^6$ ........................... H04N 1/32
[52] U.S. Cl. ............ 358/402; 358/434; 358/468
[58] Field of Search ..................... 358/468, 402, 358/403, 434, 435, 436, 438, 439, 440, 444; 379/100

[56] References Cited

U.S. PATENT DOCUMENTS

| 5,189,693 | 2/1993 | Nakajima | 379/100 |
| 5,196,944 | 3/1993 | Satake | 358/468 |
| 5,216,706 | 6/1993 | Nakajima | 379/100 |

FOREIGN PATENT DOCUMENTS

| 4-3651 | 1/1992 | Japan | H04N 1/32 |
| 4-335762 | 11/1992 | Japan | H04N 1/32 |
| 5-48816 | 2/1993 | Japan | H04N 1/32 |
| 5-153317 | 6/1993 | Japan | H04N 1/32 |

Primary Examiner—Scott A. Rogers
Attorney, Agent, or Firm—Oliff & Berridge

[57] ABSTRACT

A facsimile machine provided with a remote operation mode enabling a caller from a remote device to access and retrieve data from the facsimile machine and including a memory for storing the data to be accessed and retrieved by a caller during the remote operation mode; a switch for turning on and off the remote operation mode; facsimile reception determination unit for determining which of a facsimile reception possible condition and a facsimile reception impossible condition that the facsimile machine is in; and reception process unit for performing, when the facsimile reception determination unit determines that the facsimile machine is in a facsimile reception possible condition, reception of an incoming call regardless of whether the switch has turned the remote operation mode on or off and for performing reception of the incoming call when both the facsimile reception determination unit determines that the facsimile machine is in a facsimile reception impossible condition and the switch has turned the remote operation mode on.

13 Claims, 6 Drawing Sheets

FACSIMILE MACHINE WITH A MAILBOX FUNCTION AND REMOTE OPERATION MODE

BACKGROUND OF THE INVENTION

1. Field of the Invention

The present invention relates to a facsimile machine with a remote operation mode including a data box function by which a caller from a remote device can retrieve data stored in a memory of the facsimile machine.

2. Description of the Related Art

There has been known a facsimile machine with a mailbox function. While the facsimile machine is in its answering machine mode, a caller from a remote telephone or facsimile machine, by performing operations at the remote device, can access confidential data, such as voice data or image data, stored in mailboxes formed in a memory of the facsimile machine. To accomplish this, the facsimile machine is provided with a verbal guidance function. Upon receipt of an incoming signal from the remote telephone or facsimile machine, the facsimile machine provides verbal guidance instructing the caller how to obtain access to a specific mailbox. The caller inputs a mailbox number and special password in accordance with this verbal guidance using a control panel of his or her remote device. The remote telephone or facsimile machine transmits the mailbox number and special password to the facsimile machine in the form of a DTMF (dual tone multi frequency) signal. When the password is correct, the facsimile machine automatically transmits the confidential data in the mailbox to the remote device.

The mailbox function can be used by businesses. For example, each salesperson of a small business can be provided with a special number for one of a plurality of mailboxes formed in the memory in the facsimile machine. Each sales-person can prestore voice data or image data in his or her mailbox. Each salesperson can then inform his or her customers of the password, such as a four digit number, for the mailbox, so that the customers can access the voice data or image data.

Generally, whether or not reception of an incoming message is performed is determined depending on whether the facsimile machine is presently in a facsimile reception possible condition or a facsimile reception impossible condition. When in a facsimile reception possible condition, the facsimile machine is capable of receiving image data of incoming facsimile transmissions. When in a facsimile reception impossible condition, the facsimile machine is incapable of receiving image data of incoming facsimile transmissions. One example of a facsimile reception impossible condition would be when a facsimile machine provided with no memory unit for storing incoming image data runs out of recording paper. Another example would be when a facsimile machine provided with such a memory runs out of both paper and empty memory space at the same time. When a facsimile machine is incapable of reception for these or other reasons, it will not receive any incoming calls from a remote caller. To the remote caller, it will appear as though the facsimile machine rings continuously without the facsimile machine or its user ever picking up.

During a remote operation mode of the facsimile machine, a remote caller can retrieve data prestored in a memory of the facsimile machine as described above. Therefore, the remote operation mode and whether or not the facsimile machine is capable of reception are not directly related.

SUMMARY OF THE INVENTION

It is therefore undesirable that reception of all incoming calls be rejected during reception processes of the facsimile machine merely because the facsimile machine is incapable of receiving facsimile transmissions.

It is an objective of the present invention to provide a facsimile machine wherein regardless of whether the facsimile machine is capable of receiving facsimile transmissions, for reasons such as the facsimile machine running out of paper or out of empty memory space, reception processes are performed during the remote operation mode of the facsimile machine, thereby increasing convenience of the remote operation mode to callers.

In order to achieve the above-described objective, the facsimile machine according to the present invention, which is provided with a remote operation mode enabling a caller from a remote device to access and retrieve data from the facsimile machine, includes a memory for storing the data to be accessed and retrieved by a caller during the remote operation mode; switching means for turning on and off the remote operation mode; facsimile reception determination means for determining which of a facsimile reception possible condition and a facsimile reception impossible condition that the facsimile machine is in; and reception process means for performing, when the facsimile reception determination means determines that the facsimile machine is in a facsimile reception possible condition, reception of an incoming call regardless of whether the switching means has turned the remote operation mode on or off and for performing reception of the incoming call when both the facsimile reception determination means determines that the facsimile machine is in a facsimile reception impossible condition and the switching means has turned the remote operation mode on.

According to another aspect of the invention, the facsimile machine, which is provided with a remote operation mode enabling a caller from a remote device to access and retrieve data from the facsimile machine, includes a memory for storing the data to be accessed and retrieved by a caller during the remote operation mode; switching means for turning on and off the remote operation mode; facsimile reception determination means for determining which of a facsimile reception possible condition and a facsimile reception impossible condition that the facsimile machine is in; and reception process means for performing, regardless of which of the facsimile reception possible condition and the facsimile reception impossible condition that the facsimile reception determination means determines that the facsimile machine is in, reception of an incoming call when the switching means has turned the remote operation mode on.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
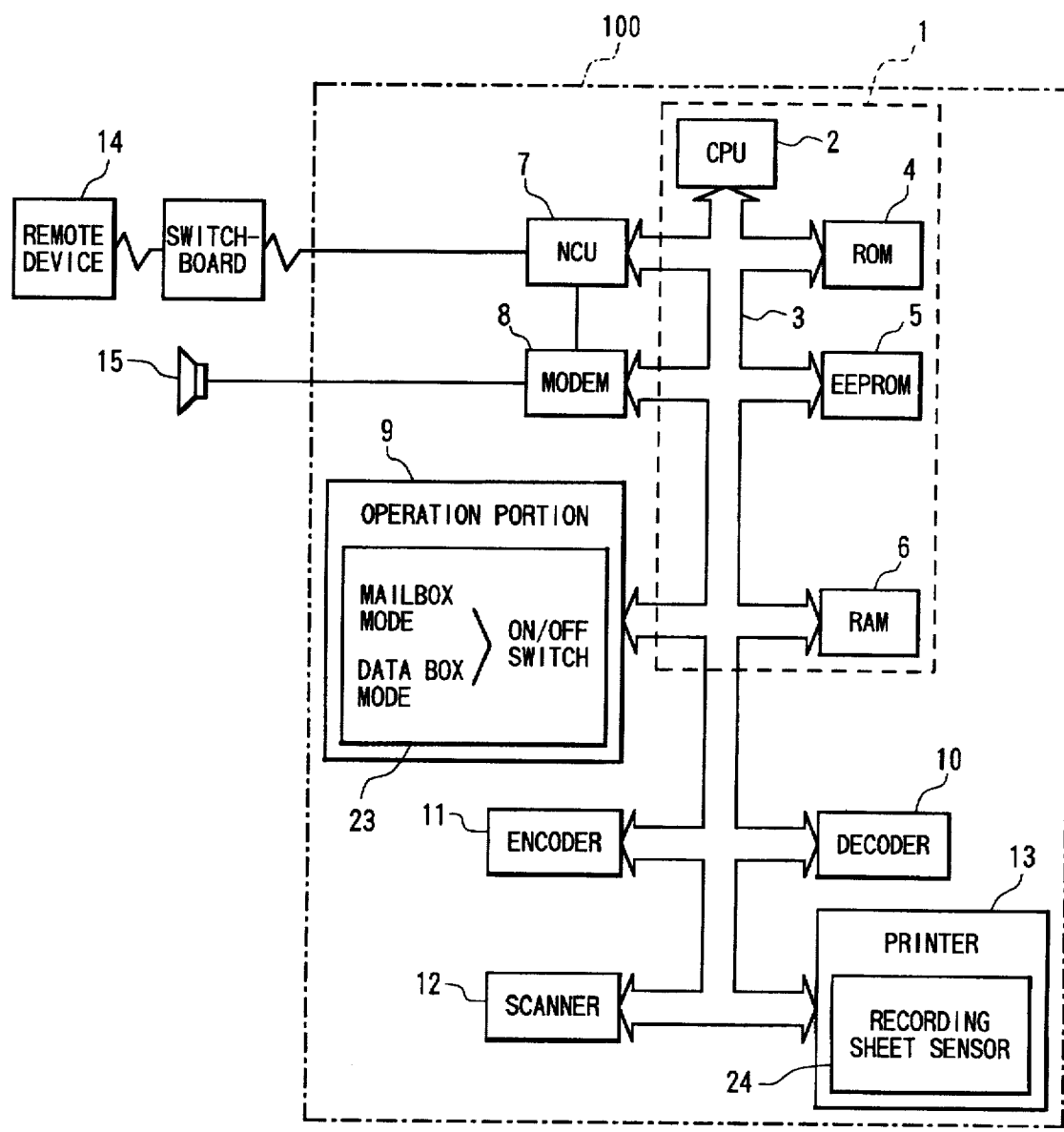
FIG. 1 is a block diagram showing a facsimile machine according to a first embodiment of the present invention.

A facsimile machine according to a preferred embodiment of the present invention will be described while referring to the accompanying drawings wherein like parts and components are designated by the same reference numerals to avoid duplicating description.

FIG. 1 is a block diagram showing essential configuration of a facsimile machine 100 according to the present embodiment. The facsimile machine 100 includes a central processing unit (CPU) 2, a ROM 4, an EEPROM 5, a RAM 6, a network control unit (NCU) 7, a modem 8 connected to a speaker 15 for monitoring the telephone circuit, an operation portion 9, a decoder 10, an encoder 11, a scanner 12, and a printer 13, all connected by a bus line 3. The CPU 2, ROM 4, the EEPROM 5, and the RAM 6 comprise a control portion 1. The ROM 4 is for storing various control programs executed by the CPU 2. The EEPROM 5 is for registering simplified dial numbers and the like. The NCU 7 is for establishing a communication line between the facsimile machine 100 and a remote facsimile machine 14. The modem 8 is for modulating a transmission signal into a form that can be transmitted over a telephone circuit during facsimile transmission and for demodulating a modulated signal transmitted over a telephone circuit. The operation portion 9 is provided with a numeric pad, various switches, and mode selection keys. In particular, the operation portion 9 is provided with a remote operation mode ON/OFF switch 23 for turning on and off a remote operation mode of the facsimile machine 100. The encoder 11 is for performing compression encoding processes on image data during a facsimile transmission. The decoder 10 is for performing decoding processes on compressed image data during reception of a facsimile message. The scanner 12 is for retrieving image data representing an image of the document. The printer 13 is for printing images on a recording sheet according to image data. The printer 13 includes a recording sheet sensor 24 for detecting presence and absence of recording sheets on which image data from a facsimile transmission is recorded.

Figure 2:
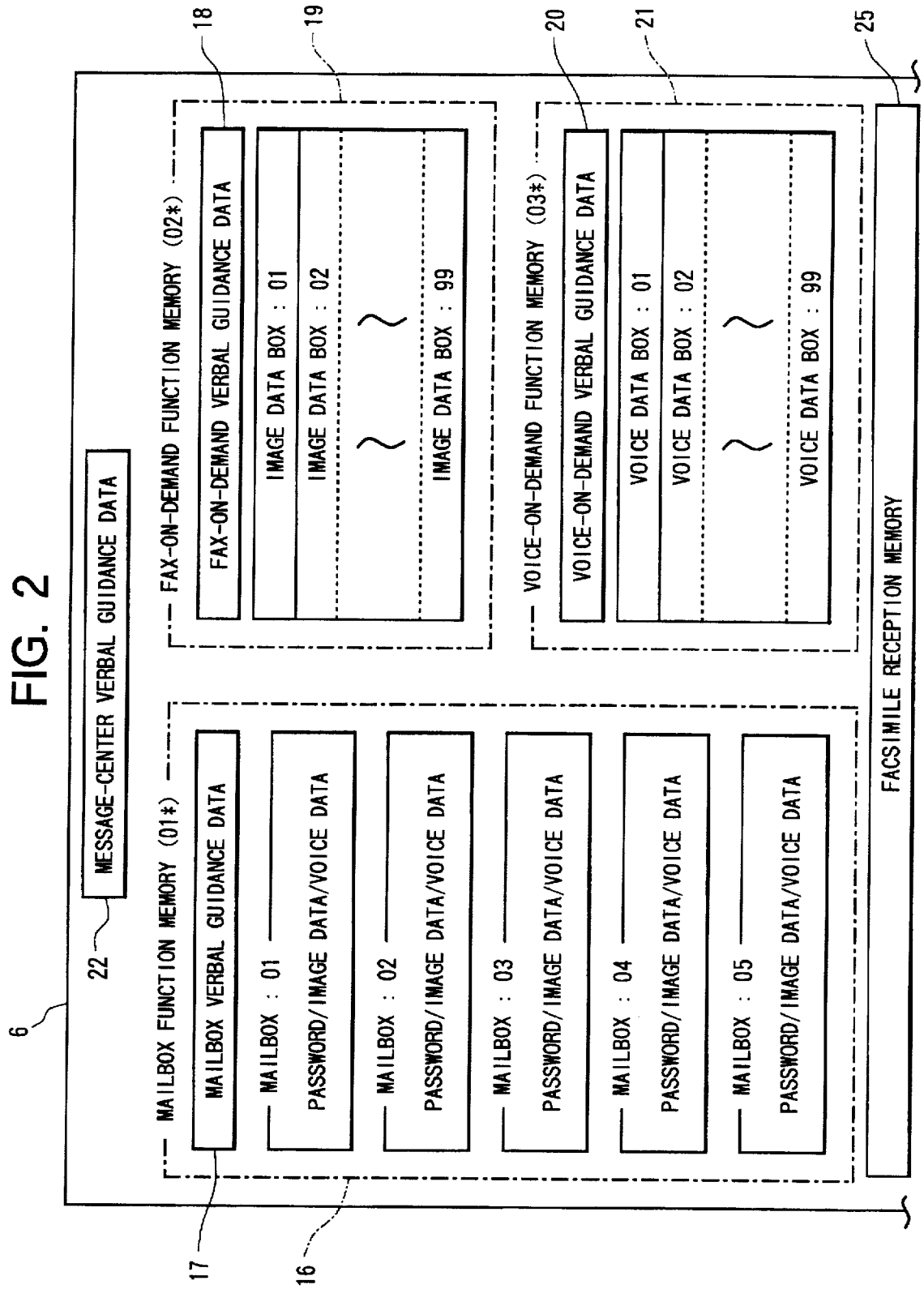
FIG. 2 is a block diagram showing allotment of memory in a RAM of the facsimile machine.

As shown in FIG. 2, the RAM 6 has a memory region with portions thereof allotted for message-center verbal guidance data 22, a mailbox memory 16 for a mailbox function, a fax-on-demand memory 19 for a fax-on-demand function, a voice-on-demand memory 21 for a voice-on-demand function, and a facsimile reception memory 25 for storing image data from an incoming facsimile transmission when no sheets for recording the image data are present.

The facsimile machine 100 can be entered into an answering machine mode. A remote operation mode can be set during the answering machine mode. In the remote operation mode, a caller from a remote location can retrieve data stored in memory of the RAM 6. The remote operation mode can be set by switching on the remote operation mode ON/OFF switch 23 provided to the operation portion 9. In the present embodiment, the mailbox function, the fax-on-demand function, and the voice-on-demand function can be performed during the remote operation mode of the facsimile machine 100. It should be noted that the present invention can also be applied to facsimile machines provided with only one of the mailbox function or the data box function. In such a case, the remote operation mode ON/OFF switch 23 could be used to turn on and off the respective function.

The mailbox memory 16 includes mailbox verbal guidance data 17, inputted in a manner to be described later, and five mailboxes 01 through 05. With the mailbox function, a caller accesses one of the mailboxes using a remote telephone or the facsimile machine 14. Then the caller can either transmit voice data or image data and store it in the mailbox or, by entering from the remote telephone or facsimile machine 14 a preset password corresponding to the accessed mailbox, can retrieve voice data, image data, or both prestored in the mailbox. Said differently, the mailbox function allows anyone from a remote place to store data into a selected mailbox. However, only people who know the password for the mailbox can retrieve data from the mailbox from a remote place. That is, the data stored in the mailbox is confidential.

The fax-on-demand memory 19 includes fax-on-demand verbal guidance data 18, inputted in a manner to be described later, and 99 image data boxes 01 through 99. With the fax-on-demand function, a caller can retrieve, in a facsimile transmission, image data stored in the facsimile machine 100 at any time over the telephone circuit, hence the name fax-on-demand function. In the present embodiment, by using the fax-on-demand function, a caller from the remote facsimile machine 14 can access one or more of the 99 image data boxes 01 through 99 and retrieve from a remote place the image data stored in any of the image data boxes.

The voice-on-demand function memory 21 includes inputted voice-on-demand verbal guidance data 20, inputted in a manner to be described later, and 99 voice data boxes 01 through 99. With the voice-on-demand function, a caller can listen to voice data stored in the facsimile machine 100 at any time over a telephone circuit, hence the name voice-on-demand function. A caller from a remote telephone or facsimile machine can access one or more of 99 voice data boxes 01 through 99 and, from a remote place, retrieve, that is, listen to, voice data stored in any of the voice data boxes.

During normal reception, decoded image data received in an incoming facsimile transmission is printed on recording sheets by the printer 3. However, when no recording sheets are available, the image data is stored in the facsimile reception memory 25. During normal transmission, image data retrieved using the scanner 12 is encoded at the encoder 11 and then transmitted via the modem 8.

The fax-on-demand function and the voice-on-demand function will be referred to collectively as a data box function because they allow a caller to retrieve data from image data boxes and voice data boxes, referred to collectively as data boxes, using a request from a remote device. As can be understood from the above description, data stored in mailboxes for the mailbox function is confidential. However, data stored in each of the data boxes for the fax-on-demand function and the voice-on-demand function, that is, in the data box function, is not confidential.

Figure 6:
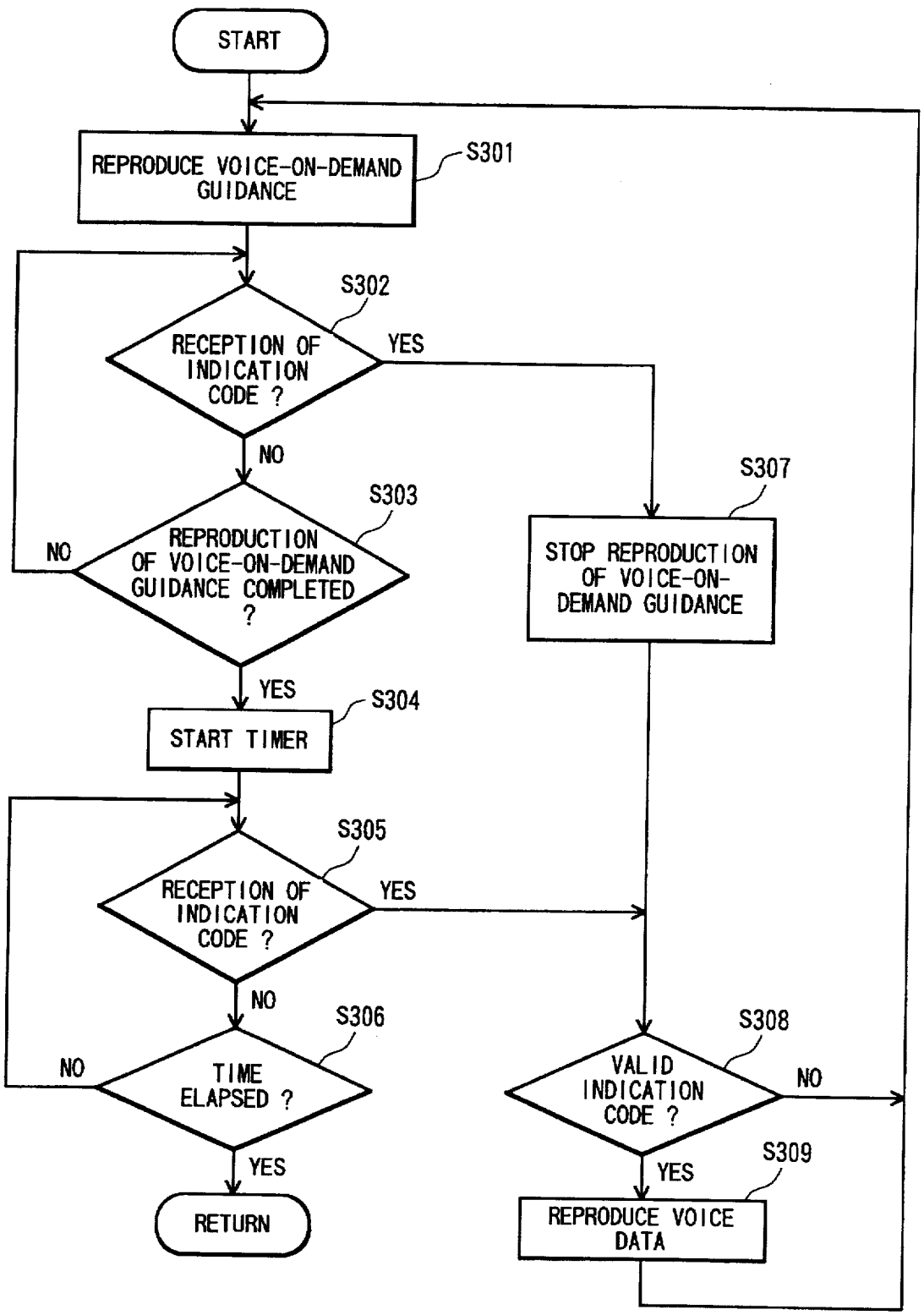
FIG. 6 is a flowchart representing a voice-on-demand routine of the facsimile machine.

To facilitate understanding of the invention, an explanation of methods for using each of the functions will be provided. In this example, each of five salespeople in an office is allotted one of the five mailboxes 01 through 05 of the mailbox function. Each salesperson registers a password for his or her allotted mailbox and also stores voice data, image data, or both which the salesperson wants to share with his or her customers. To register a password, a salesperson operates the operation portion 9 of the facsimile machine 100 to select a mode allowing password registration. Then the salesperson enters the password, for example, a four digit number using a numeric pad of the facsimile machine 100. To store voice data, a salesperson operates the operation portion 9 of the facsimile machine 100 to select a mode allowing storage of voice data into a mailbox. Then the salesperson verbally records information using a microphone of a handset of the facsimile machine 100. To store image data, a salesperson operates the operation portion 9 of the facsimile machine 100 to select a mode allowing storage of image data into a mailbox. Then the salesperson retrieves a desired document using a scanner. As shown in FIG. 6, the password, image data, and voice data for a specific mailbox are stored in the region of the mailbox memory 16 allotted for the specific mailbox.

Later, each salesperson teaches the password for his her mailbox to his or her customers to enable customers to have access to the data in the mailbox. A salesperson can optionally enter verbal guidance for explaining how to use the mailbox function. To do so, the salesperson operates the operation portion 9 to select a mode allowing mailbox guidance to be verbally entered. Then the salesperson verbally records directions using the microphone of the handset. As shown in FIG. 6, the inputted verbal guidance is stored as mailbox verbal guidance data 17 in a predetermined region of the mailbox memory 16.

Image data for use by all salespeople of the office is stored in each of the image data boxes 01 through 99 of the fax-on-demand memory 21. In this example, information on new products is stored in the image data boxes 01 through 10: information on prices of manufactured goods is stored in the image data boxes 11 through 20; information on delivery schedule of goods is stored in the image data boxes 21 through 30; information on the company's entire product line up is stored in the image data boxes 31 through 40; and information on product order forms is stored in the image data boxes 41 through 50.

To store image data in a specific image data box, a user operates the operation portion 9 to select a mode allowing storage of image data in the specific image data box. Then the user retrieves uses the scanner to retrieve an image from a predetermined document 12. A user can input verbal guidance for explaining how to use the fax-on-demand function. To do so, the user operates the operation portion 9 to select a mode allowing input of verbal guidance of the fax-on-demand function. Then the user verbally records instructions using the microphone of the handset. As shown in FIG. 6, the inputted verbal guidance is stored as fax-on-demand verbal guidance data 18 in the fax-on-demand memory 19.

Verbal information corresponding to image data stored in the image data boxes for the fax-on-demand function can be stored in each of the voice data boxes 01 through 99 for the voice-on-demand function. In this way, the same information provision service can be provided to customers without facsimile machines. Other information can alternatively be stored in the voice data boxes. To store voice data, an operator or user operates the operation portion 9 to select a mode for allowing storage of voice data in a voice data box having a specified number. Then the user verbally records messages using the microphone of the handset. A user can input verbal guidance for explaining how to use the voice-on-demand function. The user operates the operation portion 9 to select a mode allowing input of verbal guidance for the voice-on-demand function. Then the user verbally records instructions using the microphone of the handset. As shown in FIG. 6, inputted verbal guidance is stored as voice-on-demand verbal guidance data 20 in a predetermined region of the voice-on-demand memory 21.

The facsimile machine 100 can be set to a remote operation mode, which includes the mailbox function, the fax-on-demand on-demand function, and the voice-on-demand function. While the remote operation mode ON/OFF switch 23 is switched on so that the facsimile machine 100 is in the remote operation mode, a caller can select any of the above functions from a remote place to retrieve desired data. The mailbox function, the fax-on-demand function, and the voice-on-demand function will be referred to collectively as a message-center function hereinafter.

To introduce the message-center function to callers, thereby enabling callers to easily use services offered by the company, the facsimile machine 100 provides verbal guidance to callers upon receiving an incoming transmission while in the answering machine mode. The present embodiment enables input of message-center verbal guidance data 22 to be provided to a caller during reception of an incoming message. A user inputs the message-center verbal guidance data 22 by manipulating the operation portion 9 to select a mode enabling input of message-center verbal guidance. Then the user records a predetermined verbal message using the microphone of the handset. As shown in FIG. 6, the inputted verbal guidance is stored as message-center verbal guidance 22 in a predetermined region of the RAM 6.

Figure 3:
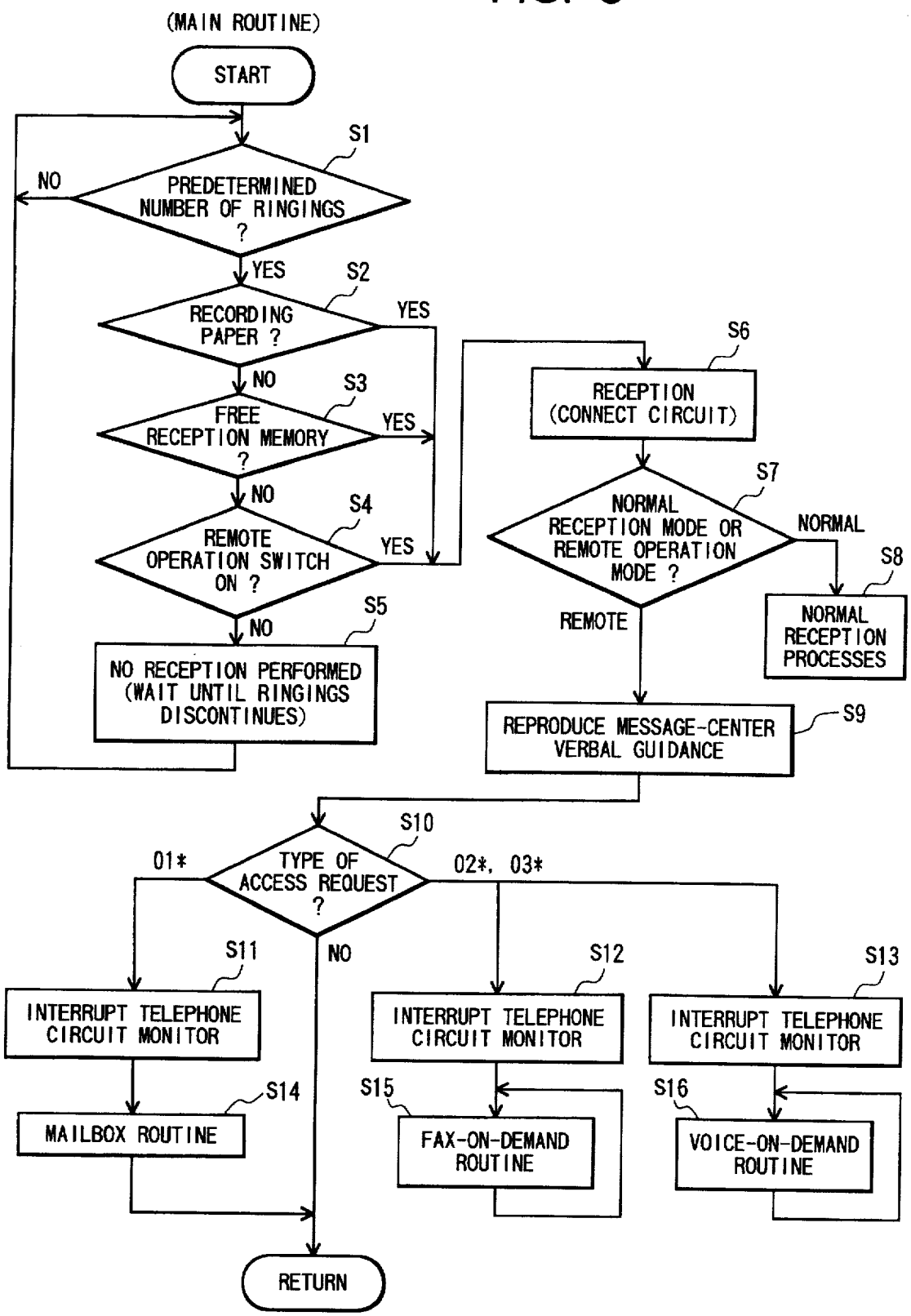
FIG. 3 is a flowchart representing a main routine of the facsimile machine.

Next, the operations of the facsimile machine 100 during the answering machine mode will be described. FIG. 3 shows a flowchart representing a main routine performed upon arrival of an incoming call when the answering machine mode is selected. When an incoming call from a remote device, such as a telephone or a facsimile machine, arrives at the facsimile machine 100, then whether or not a predetermined number of ringings has been rung is determined in step 1. Individual steps will be referred to in the drawings and the following text as Si, wherein i is the number of an individual step. If a predetermined number of ringings have been detected (S1:YES), then whether or not there are recording sheets is determined in S2 using the recording sheet sensor 24 of the printer 13. When there are recording sheets (S2:YES), then the facsimile machine 100 is in a condition where it is capable of receiving incoming facsimile transmissions. Therefore the telephone circuit is connected and reception of the incoming facsimile transmission is started in S6. When it is determined that there are no recording sheets (S2:NO), then whether or not any free memory exists in the facsimile reception memory 25 of the RAM 6 is determined in S3. When free memory exists in the facsimile reception memory 25 (S3:YES), then it is also determined that reception of a facsimile transmission is possible. Therefore, the telephone circuit is connected and reception of the facsimile transmission started in S6. On the other hand, when it is determined in S3 that no free memory exists in the facsimile reception memory 25 (S3:NO), then whether or not the remote operation mode ON/OFF switch 23 is on is determined in S4. If the remote operation mode ON/OFF switch 23 is switched on (S4:YES), then the program proceeds to S6, whereupon the telephone circuit is connected and reception of the facsimile transmission started. If the remote operation mode ON/OFF switch 23 is switched off (S4:NO), then reception will not be performed. That is, the program waits in S5 for the caller to hang up so that the call from the caller is terminated. Then the program returns to S1 and waits to receive another call from a caller.

In other words, when an incoming facsimile transmission can not be received, either by recording the image data on a recording sheet or by storing the image data in a memory, then reception is not performed when the remote operation mode is not selected. However, when the remote operation mode is selected, then the facsimile machine 100 performs reception even if the facsimile machine 100 is incapable of receiving incoming facsimile transmissions.

After reception is started in S6, then whether the facsimile machine 100 is on or off is determined in S7, as described above for S4. That is, the facsimile machine 100 is in the remote operation mode when the remote operation mode ON/OFF switch 23 is on and in the normal reception mode with the remote operation mode ON/OFF switch 23 is off. When the facsimile machine 100 is in the normal reception mode (S7:normal), then normal reception processes are performed in S8. That is, when there are recording sheets, then the image data received during the incoming facsimile transmission is printed on recording sheets, when there are no recording sheets, then the image data is stored in the facsimile reception memory 25.

When the facsimile machine 100 is in the remote operation mode (S7:remote), then reproduction and transmission of the message-center verbal guidance data 22 are started in S9. An example of possible message-center verbal guidance data 22 for the company in this example would be, "Those who wish to leave a message in the mailbox of any of salespeople A through E or who wish to retrieve the contents from the mailbox of any of salespeople A through E, please enter 01* now. Those who wish to receive a fax about our new products, please enter 02* now. Those who wish to hear about our new products, please enter 03, now." It should be noted that at this time the telephone circuit is monitored using the speaker 15.

Next, the type of access a caller is requesting is determined in S10. That is, which of 01*, 02*, or 03* were entered, or whether nothing was entered, is determined. An input signal from the caller is transmitted to the facsimile machine 100 as a DTMF signal, which is reproduced at the speaker 15 as beeping tones. When nothing is inputted for a predetermined period of time (S10:NO), the main routine is terminated. When 01*, 02*, or 03* is entered (S10:01*,02*, or 03*), then the telephone circuit monitor is interrupted in corresponding S11, S12, or S13. Then, respectively, the program proceeds to either a mailbox routine in S14, a fax-on-demand routine in S15, or a voice-on-demand routine in S16. As a result, nothing can be heard over the speaker 15 after proceeding to these routines.

Figure 4:
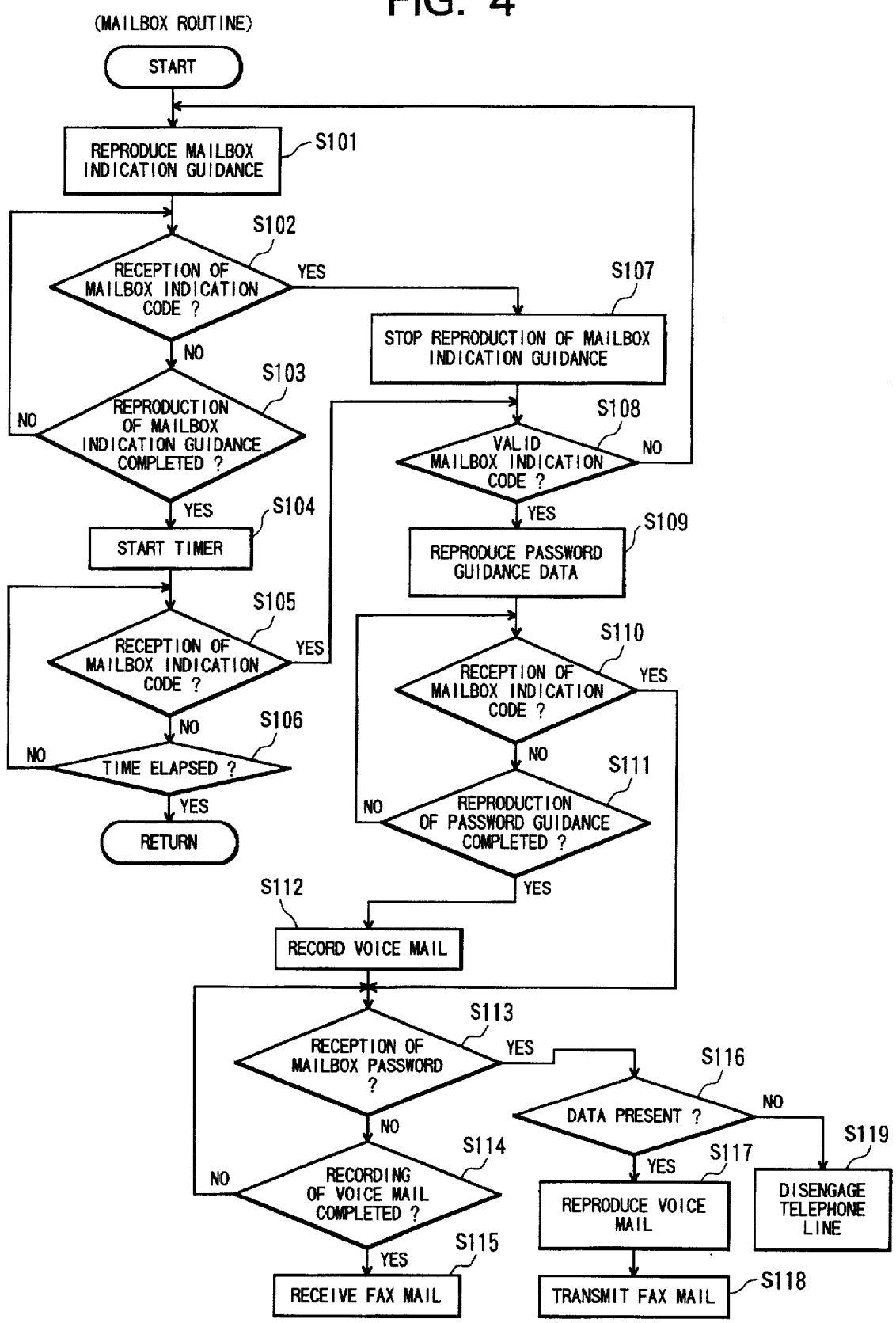
FIG. 4 is a flowchart representing a mailbox routine of the facsimile machine.

FIG. 4 shows the mailbox routine performed in S14 of FIG. 3. First, mailbox indication guidance data of the mailbox verbal guidance data 17 is reproduced and transmitted in S101 to prompt the caller to indicate a mailbox. An example of resultant verbal guidance would be "hose wishing access to the mailbox of salesperson A, please input 01* now.... Those wishing access to the mailbox of salesperson E, input 05* now." Whether or not a mailbox indication code such as 01* has been inputted is determined in S102. When a mailbox indication code has been inputted (S102:YES), then processes for reproducing and transmitting the mailbox indication guidance are stopped in S107. Then whether or not the inputted mailbox indication code is valid is determined in S108. If the inputted mailbox indication code is not a valid code (S108:NO), then the routine returns to S101, whereupon the mailbox indication guidance is again reproduced and transmitted to prompt the caller to again enter a mailbox indication code. When the inputted mailbox indication code is a valid code, that is, when the user correctly inputs one of 01* through 05* (S108:YES), then the routine proceeds to S109.

When no mailbox indication code is inputted in S102 (S102:NO), the routine waits in S103 for reproduction and transmission of the mailbox indication guidance to be completed. Once the mailbox indication guidance is completed (S102:YES), a timer for timing, for example, five seconds is started in S104. Then input of a mailbox indication code is received in S105 and S106. That is, the mailbox indication guidance can only continue for a limited length of time related to the capacity of the memory allotted for the mailbox indication guidance. However, in the present embodiment, input of the mailbox indication code is received for five seconds further after the mailbox indication guidance is completed. When a mailbox indication code is inputted during the five second period (S105:YES), then the routine proceeds to S108, whereupon whether or not the inputted code is a valid code is determined. If the inputted code is not a valid code (S108:NO), then the routine returns to S101 as described above. If no mailbox indication code is inputted within the five second period (S106:YES), then the routine returns to the start of the operation performed directly before entering the mailbox routine.

When a valid mailbox indication code is inputted (S108:YES), then password guidance data of the mailbox verbal guidance data 17 for the indicated mailbox is reproduced and transmitted in S109. As an example, it will be assumed that the caller inputted the mailbox indication code 01*, that is, the code for the mailbox of salesperson A. In this case, an example of password guidance would be "Hello, this is salesperson A. Those who wish to retrieve information from my mailbox, please again input my mailbox number 01* and then enter the password. Those who wish to leave me a verbal message, please do so after hearing the beep. Those who wish to leave me a fax message, please press the start button on your fax machine and send me the fax message."

Whether or not a mailbox indication code has been inputted is determined in S110. When a mailbox indication code has been inputted (S110:YES), this means that the caller wishes to retrieve the content of the mailbox. On the other hand, when no mailbox indication code is inputted (S110:NO) before the password guidance has been completely reproduced (S111:YES), then this means that the caller does not intend to retrieve information from the mailbox. When the password guidance ends (S111:YES), a beep is sounded indicating that the caller can leave a verbal message. The verbal message from the caller is recorded in S112 for a set time. The verbal message, or voice mail, is stored in the mailbox.

Next, whether or not a password has been inputted is determined in S113. The determination of S113 is performed when a mailbox indication code is received in S110 (S110:YES) and also after recording of a verbal message is started in S112. Therefore, a caller can access the information in the mailbox by inputting a password even after inputting a mailbox indication code. When a password is inputted in S113 (S113:YES), then whether or not data exists in the mailbox is determined in S116. When data exists (S116:YES), then a routine for reproducing the voice mail in the mailbox is performed in S117. Then a routine for reproducing fax mail, that is, facsimile image data, is performed in S118. That is, voice data, image data, or both in the mailbox is transmitted to the caller. Reception of password input is continued as long as a time duration wherein recording of a verbal message by the user continues (S114:NO). When this time duration ends (S114:YES), then reception of a fax message from the caller starts in S115. The message-center function automatically ends either when reception in S115 of a fax message from the caller ends or when reproduction of the fax mail in S118 ends.

Whether or not data exists is determined in S116 of the present embodiment. If data exists (S116:YES), then the data stored in the mailbox is transmitted to the caller as described above. However, when no data exists (S116:NO), then the telephone circuit is interrupted in S119, thereby forcibly terminating the message-center function. In this way, the telephone circuit connection is not maintained any longer than needed so that the telephone line can be effectively used. When, as in the present embodiment, a plurality of boxes are provided in the same facsimile machine, or when many people use a fax-on-demand function or a voice-on-demand function to be described later, then the facsimile machine will be often accessed by callers. Other callers will be inconvenienced when one caller monopolizes a telephone circuit unnecessarily. However, this inconvenience is alleviated by the above-described configuration.

As described previously with reference to FIG. 1, the telephone circuit monitor is interrupted in S11 before proceeding to the mailbox routine in S14. Therefore, in the mailbox routine, even if the remote facsimile machine transmits the password as a DTMF signal, beeping tones corresponding to the DTMF signal will not be reproduced at the speaker 15. Therefore, the confidentiality of the password, and therefore the confidentiality of the information in the mailbox, is protected. It should be understood that a salesperson, upon returning to the office, can operate the operation portion 9 to retrieve voice mail or fax mail left in his or her mailbox by a caller.

Figure 5:
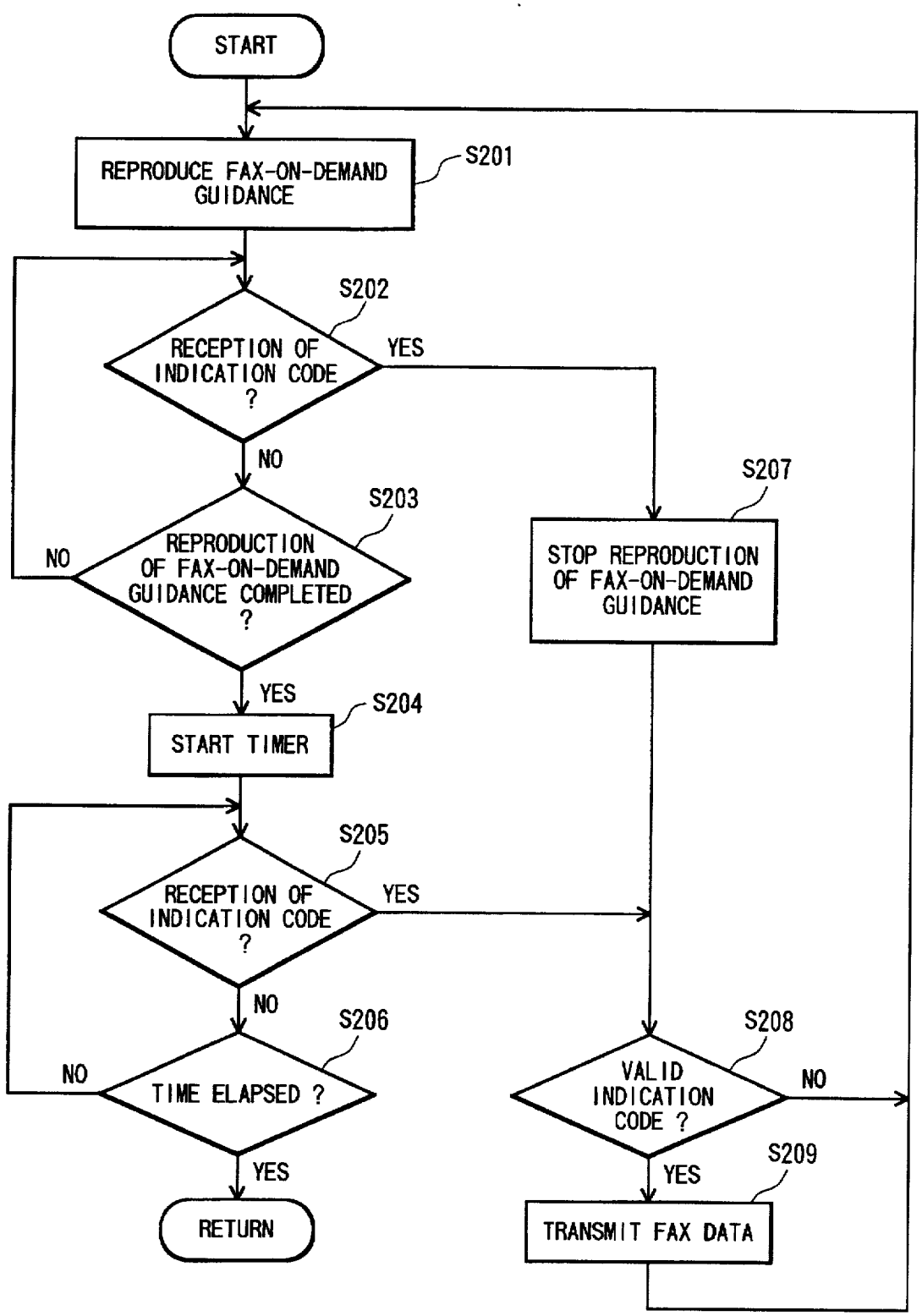
FIG. 5 is a flowchart representing a fax-on-demand routine of the facsimile machine.

FIG. 5 shows a fax-on-demand routine performed in S15. First, the fax-on-demand verbal guidance data 18 is reproduced and transmitted in S201. An example of verbal guidance reproduced and transmitted in S201 for a business situation would be "Callers can receive brochures and other literature describing our company's products by fax. Those who wish to receive information on our new products, please enter one of 01* through 10* now. Those who wish to receive information on our product's prices, please enter one of 11* through 20* now. Those who wish to receive information on our delivery schedule, please enter one of 21* through 30* now. Those who wish to receive information on our entire product lineup, please enter one of 31, through 40* now. Those who wish to receive order forms, please enter one of 41* through 50* now. Callers can received details on this facsimile service and on specific operating methods by inputting 99* now."

Next, whether or not an image-data-box indication code of an image data box has been inputted is determined in S202. If an indication code has been inputted (S202:YES), then reproduction and transmission of the fax-on-demand verbal guidance data 18 are stopped in S207 and whether or not the inputted image-data-box indication code is valid is determined in S208. If the inputted code is valid (S208:YES), then image data in the indicated image data box is transmitted to the caller as a facsimile transmission in S209. When the indication code is not valid (S208:NO), then the routine returns to S201, whereupon reproduction and transmission of the fax-on-demand verbal guidance data 18 are restarted to prompt the caller to again input an image-data-box indication code. An example of when an inputted image-data-box indication code is not a valid indication code includes when the caller inputs a number, such as a three digit number, other than 01 through 99 of the 99 image data boxes formed in the fax-on-demand memory 19. After the image data of the indicated image data box is transmitted in S209, then the routine returns to S201, thereby repeating the above-described processes.

Then it is determined in S202 that no image-data-box indication code has been inputted (S202:NO), then whether or not reproduction of the fax-on-demand verbal guidance data 18 has been completed is determined in S203. If the fax-on-demand verbal guidance data 18 has been completed (S203:YES), then a timer for counting, for example, five seconds is started in S204. Then the routine waits for reception of an image-data-box indication code in S205 and S206. If within the five second period an image-data-box indication code is received (S205:YES), then whether or not the inputted image-data-box indication code is valid is determined in S208 as described above. If the inputted image-data-box indication code is valid (S208:YES), then image data in the indicated image data box is transmitted to the caller in a facsimile transmission in S209. On the other hand, if the five second period elapses before an image-data-box indication code is inputted (S206:YES), then the program returns to the step before entering this routine. That is, in the present embodiment, the fax-on-demand routine will not automatically end unless the caller hangs up. Accordingly, when no data exists in the indicated image data box, this routine automatically returns to its start and restarts reproduction and transmission of the fax-on-demand guidance data 18, thereby enabling a caller to indicate and access another image data box. This is because no password is required to access data in the image data boxes of the fax-on-demand function.

FIG. 6 shows a flowchart representing a voice-on-demand routine performed in S16. First, the voice-on-demand verbal guidance data 20 is reproduced and transmitted in S301. An example of voice-on-demand verbal guidance data 20 reproduced and transmitted for an office would be, "You can hear a verbal description of our company's products. Those wishing to hear information about our company's new products, please enter one of 01* through 10* now. Those wishing to hear information about our company's product prices, please enter one of 11* through 20* now. Those wishing to hear information about our company's product delivery schedule, please enter one of 21* through 30* now. Those wishing to hear information about our company's entire product line up, please enter one of 31* through 40* now. You can receive a facsimile transmission of a pamphlet explaining details of operations and content of this voice service by inputting 99* now."

Next, whether or not a voice-data-box indication code has been inputted is determined in S302. If voice-data-box indication code has been inputted (S302:YES), the reproduction and transmission of the voice-on-demand verbal guidance data 20 are stopped in S307. Then whether or not the inputted voice-data-box indication code is valid is determined in S308. If the voice-data-box indication code is valid (S308:YES), then content of the indicated voice data box is transmitted to the caller in S309. If the voice-data-box indication code is not valid (S308:NO), then the routine returns to S301, whereupon the voice-on-demand verbal guidance data 20 is again reproduced and transmitted to prompt the caller to enter proper voice-data-box indication code. Examples of when the inputted voice-data-box indication code is not a valid indication code include when the caller indicates one of the 99 voice data boxes 01 through 99 formed in the voice-on-demand memory 21, but indicates one with no data stored therein, or inputs a number other than 01 through 99, such as a three digit number. After the voice data of the indicated voice data box is transmitted in S309, then the routine returns to S301, thereby repeating the above-described processes.

When it is determined in S302 that no voice-data-box indication code has been inputted (S302:NO), then whether or not reproduction of the voice-on-demand verbal guidance data 20 has been completed is determined in S303. If reproduction has been completed (S303:YES), then a timer for measuring, for example, a five second duration is started in S304. Then reception of a voice-data-box indication code is awaited during this five second duration in S305 and S306. When a voice-data-box indication code is received during the five second interval (S305:YES), then, as described above, whether or not the inputted voice-data-box indication code is valid is determined in S308. If the code is valid (S308:YES), then the content of the indicated voice data box is transmitted to the caller in S309. On the other hand, when the five second duration elapses (S306:YES), then the program returns to the start of operations performed directly before entering the voice-on-demand routine. That is, in the present embodiment, the voice-on-demand routine will not automatically end unless the caller hangs up. Accordingly, when no data exists in the indicated voice data box, this routine automatically returns to its start and restarts reproduction and transmission of the voice-on-demand guidance data 20, thereby enabling a caller to indicate and access another voice data box. This is because no password is required to access data in the voice data boxes of the voice-on-demand function.

According to the present invention, when the remote operation mode is selected, by performing operations at the remote device, a caller can access and retrieve data stored in memory of the facsimile machine 100 even under circumstances where reception of incoming image data is impossible, such as when recording paper runs out or when reception memory is full.

Regardless of whether the facsimile machine 100 is in a condition wherein reception of image data is impossible, a caller can retrieve confidential data which requires a password to access, nonconfidential data which requires no password to access, or both.

Regardless of whether the facsimile machine 100 is in a condition wherein reception of image data is impossible, a caller can use the mailbox function to retrieve voice data, image data, or both. That is, a caller can listen to the voice data of the mailbox using a telephone.

Regardless of whether the facsimile machine 100 is in a condition wherein reception of image data is impossible, a caller can use the data box function to retrieve voice data, image data, or both. That is, a caller can listen to the voice data of the data box using a telephone.

While the invention has been described in detail with reference to specific embodiments thereof, it would be apparent to those skilled in the art that various changes and modifications may be made therein without departing from the spirit of the invention, the scope of which is defined by the attached claims.

What is claimed is:

1. A facsimile machine provided with a remote operation mode enabling a caller from a remote device to access and retrieve data from the facsimile machine, the facsimile machine comprising:

a memory for storing the data to be accessed and retrieved by a caller during the remote operation mode;

switching means for turning on and off the remote operation mode;

facsimile reception determination means for determining which of a facsimile reception possible condition and a facsimile reception impossible condition that the facsimile machine is in; and reception process means for performing, when the facsimile reception determination means determines that the facsimile machine is in a facsimile reception possible condition, reception of an incoming call regardless of whether the switching means has turned the remote operation mode on or off and for performing reception of the incoming call when both the facsimile reception determination means determines that the facsimile machine is in a facsimile reception impossible condition and the switching means has turned the remote operation mode on.

2. A facsimile machine as claimed in claim 1, wherein: the memory forms a plurality of mailboxes storing the data; and the remote operation mode includes a mailbox function wherein a caller from a remote device can indicate one of the plurality of mailboxes by using a mailbox indication code transmitted from the remote device in the form of a DTMF signal and then access and retrieve data from the indicated mailbox by using a password transmitted from the remote device in the form of a DTMF signal.

3. A facsimile machine as claimed in claim 2, wherein:
   the memory forms a plurality of data boxes storing the data; and
   the remote operation mode includes a data box function wherein a caller from a remote device can indicate, access, and retrieve data from one of the plurality of data boxes by using a data box indication code transmitted from the remote device in the form of a DTMF signal.

4. A facsimile machine as claimed in claim 3, wherein the plurality of mailboxes are capable of storing at least one of image data and voice data.

5. A facsimile machine as claimed in claim 3, wherein the plurality of data boxes are capable of storing at least one of image data and voice data.

6. A facsimile machine as claimed in claim 2, wherein the plurality of mailboxes are capable of storing at least one of image data and voice data.

7. A facsimile machine as claimed in claim 1, wherein:
   the memory forms a plurality of data boxes storing the data; and
   the remote operation mode includes a data box function wherein a caller from a remote device can indicate, access, and retrieve data from one of the plurality of data boxes by using a data box indication code transmitted from the remote device in the form of a DTMF signal.

8. A facsimile machine as claimed in claim 7, wherein the plurality of data boxes are capable of storing at least one of image data and voice data.

9. A facsimile machine as claimed in claim 1, wherein the facsimile reception determination means detects presence and absence of recording sheets in the facsimile machine to determine which of the facsimile reception possible condition and the facsimile reception impossible condition that the facsimile machine is in.

10. A facsimile machine as claimed in claim 9, further comprising a facsimile reception memory for storing image data of incoming facsimile transmissions, the facsimile reception determination means also detecting presence and absence of free memory to determine which of the facsimile reception possible condition and the facsimile reception impossible condition that the facsimile machine is in.

11. A facsimile machine provided with a remote operation mode enabling a caller from a remote device to access and retrieve data from the facsimile machine, the facsimile machine comprising:

a memory for storing the data to be accessed and retrieved by a caller during the remote operation mode;

switching means for turning on and off the remote operation mode;

facsimile reception determination means for determining which of a facsimile reception possible condition and a facsimile reception impossible condition that the facsimile machine is in; and reception process means for performing, regardless of which of the facsimile reception possible condition and the facsimile reception impossible condition that the facsimile reception determination means determines that the facsimile machine is in, reception of an incoming call when the switching means has turned the remote operation mode on.

12. A facsimile machine as claimed in claim 11, wherein:

the memory forms a plurality of mailboxes storing the data; and the remote operation mode includes a mailbox function wherein a caller from a remote device can indicate one of the plurality of mailboxes by using a mailbox indication code transmitted from the remote device in the form of a DTMF signal and then access and retrieve data from the indicated mailbox by using a password transmitted from the remote device in the form of a DTMF signal.

13. A facsimile machine as claimed in claim 11, wherein:

the memory forms a plurality of data boxes storing the data; and the remote operation mode includes a data box function wherein a caller from a remote device can indicate, access, and retrieve data from one of the plurality of data boxes by using a data box indication code transmitted from the remote device in the form of a DTMF signal.

* * * * *